Dec. 8, 1925.
E. L. LEINBACH
SHOCK ABSORBER
Filed Nov. 24, 1924
1,564,864
2 Sheets-Sheet 1
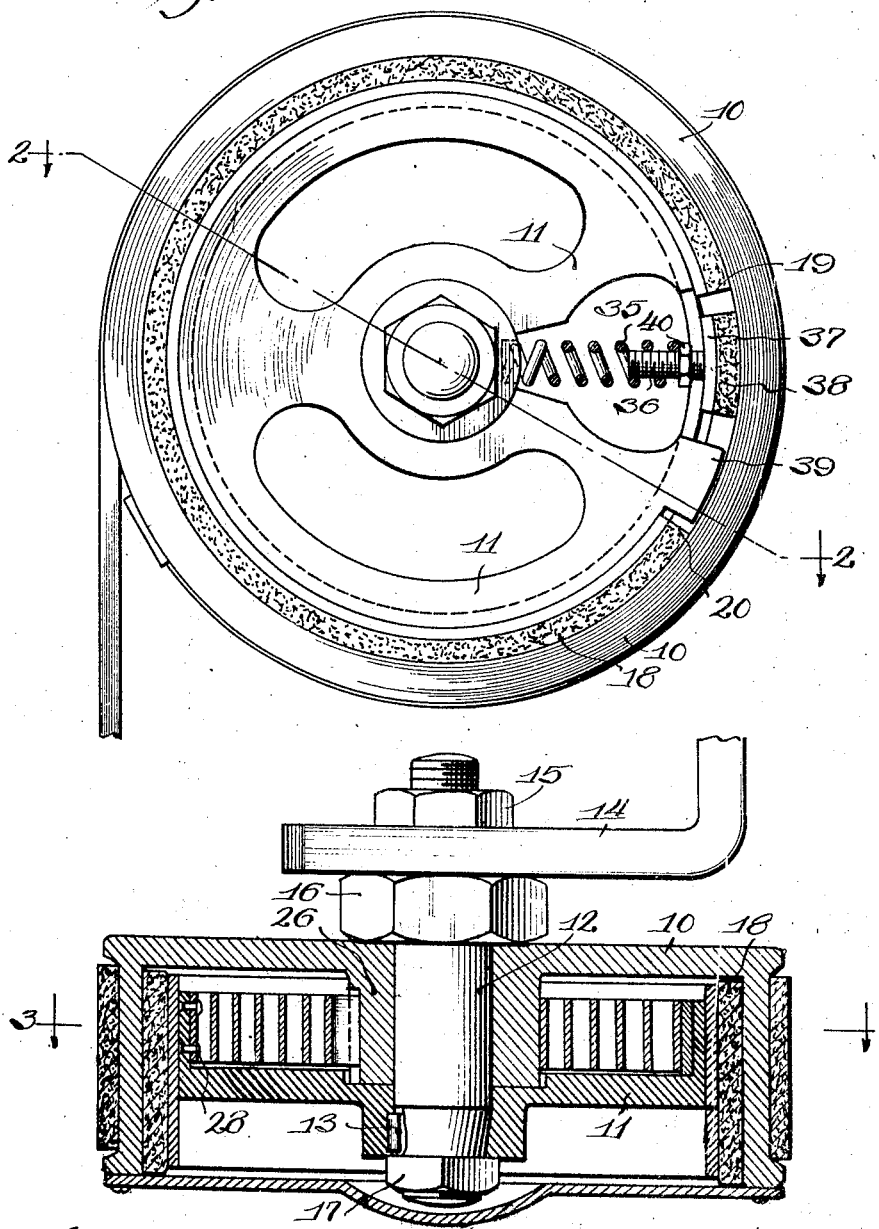

Dec. 8, 1925.

E. L. LEINBACH

SHOCK ABSORBER

Filed Nov. 24, 1924

Inventor
Edward L. Leinbach
By [signature] Atty.

Patented Dec. 8, 1925.

1,564,864

UNITED STATES PATENT OFFICE.

EDWARD L. LEINBACH, OF CHICAGO, ILLINOIS.

SHOCK ABSORBER.

Application filed November 24, 1924. Serial No. 751,980.

*To all whom it may concern:*

Be it known that I, EDWARD L. LEINBACH, a citizen of the United States, residing at Chicago, in the county of Cook and State of Illinois, have invented certain new and useful Improvements in Shock Absorbers, of which the following is a specification.

This invention relates to improvements in shock absorbers particularly adapted, though not necessarily limited in its use, for controlling the action of supporting springs of vehicles and especially for the purpose of retarding or modifying the action of the springs when they are subjected to violent shocks and rebounds due to obstructions and irregularities in the road bed.

A further object of the invention is to provide an improved shock absorber of this character which will permit the vehicle springs to have a limited degree of free movement under normal conditions and during which time the shock absorber will be inactive with respect to modifying or retarding the spring action, but which will quickly and automatically be rendered active by the slightest abnormal condition.

A further object is to provide an improved shock absorber of this character in which the parts will be completely housed and protected.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which—

Figure 1 is a view in side elevation of a shock absorber of this character constructed in accordance with the principles of this invention, and with a portion of the casing or housing removed.

Figure 2 is a sectional view taken on line 2—2, Figure 1.

Figure 3:
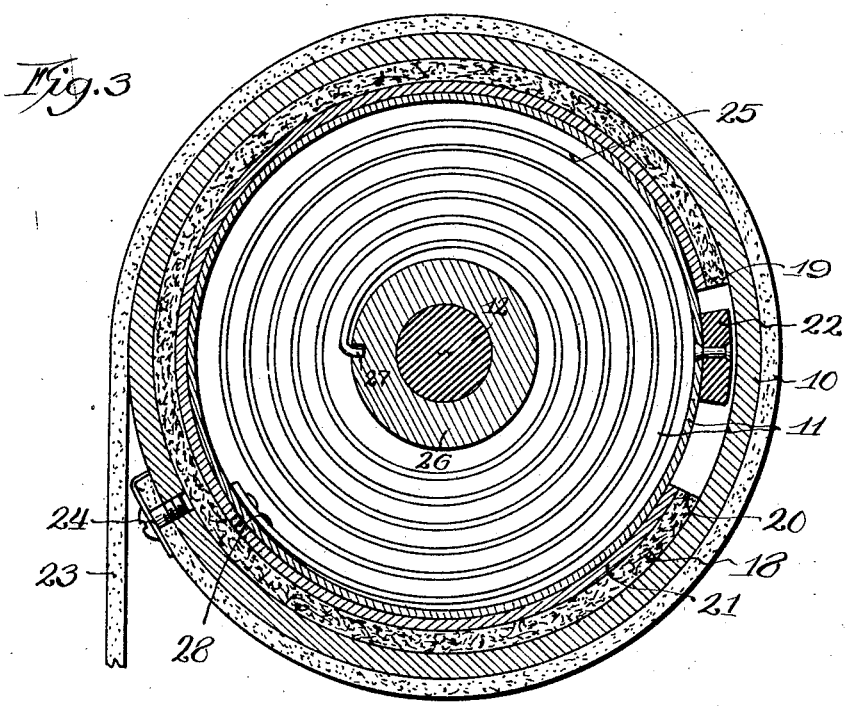
Figure 3 is a sectional view taken on line 3—3, Figure 2.

Referring more particularly to the drawings the numerals 10 and 11 designate concentrically arranged drum like members, the member 10 forming a housing for the operating parts of the absorber.

The member 11 is anchored to a suitable fixed support and held against rotation in any suitable manner such as by means of a bolt or trunnion 12 to which the member 10 is secured, preferably by means of a key 13. The bolt or trunnion 12 is connected with a bracket or support 14 by one end, through the medium of a nut or collar 15 threaded upon the extremity thereof, and which nut or collar co-operates with a shouldered portion 16 on the bolt or trunnion. A nut 17 may be provided on the other end of the trunnion to permit the removal of the member 11 when desired.

The member 11 is of a diameter somewhat smaller than the internal diameter of the member 10 to form a space therebetween and the member 10 is mounted upon the trunnion 12 for free rotation. Arranged within the space between the outer periphery of the member 11 and the inner periphery of the member 10 is a friction creating member 18 which is constructed of any suitable material and partially encompasses the periphery of the member 11. The ends 19 and 20 of the friction creating member 18 terminate short of each other, and secured to one face of the member 18 is a resilient band 21, constructed of any suitable material so as to re-enforce the member 18 and assist in imparting resiliency thereto.

The friction element thus formed is adapted for free floating movement between the members 10 and 11, that is the resiliency of the element 18 is such that it will create a friction between the element and the inner face of the outer member 10 to move bodily with the outer member 10 when the latter is rotated in either direction with respect to the inner member 11.

Secured to or forming a part of the member 11 is a lug or projection 22 which stands within the space formed between the ends 19 and 20 of the friction creating element 18; the ends of the re-enforcing member 21 also terminate adjacent the respective ends 19 and 20 of the member 18.

This lug or projection 22 is held stationary inasmuch as it is connected with the anchored member 11 and during a limited forward and backward movement of the member 10 with respect to the member 11, the member 10 and the resilient friction creating element 18 will have a limited free movement so as not to retard or modify the action of the spring of the vehicle, during which movement the element 18 will be carried forwardly and backwardly with the member 10.

When the member 10 is rotated in an anticlockwise direction sufficiently to cause the end 20 of the element 18 to engage the lug or projection 22, the floating or bodily movement of the element 18 with the member 10 will be arrested and further movement of the member 10 in the same direction will cause the element 18 to be expanded to increase the friction between the element 18 and the member 10, thereby retarding or modifying the action of the spring of the vehicle.

When the drum or member 10 is rotated in the opposite or in a clockwise direction the element 18 will be carried with the member 10 until the end 19 of the element 18 contacts with the projection 22 and this will release the friction between the element 18 and the member 10, and allow the element 18 to contract sufficiently to permit a free movement of the member 10.

Any suitable means may be provided for rotating the member 10, such as a flexible member or strap 23 which is anchored by one extremity as at 24 to the periphery of the member 10 and passes around the periphery of the member 10. The free end of the flexible strap 23 may be anchored to any suitable portion of the vehicle.

A spring 25 is coiled about the hub 26 of the member 10 and is anchored as at 27 to the hub at the inner end of the spring and the outer end of the spring 28 is anchored to the inner periphery of the drum or member 11, so that when the outer member 10 is being rotated in an anticlockwise direction by means of the strap or member 23, the spring 25 will be wound to store energy therein and this energy will cause the member 10 to be rotated in the opposite or a clockwise direction when the stress is released upon the strap or member 23.

With this construction it will be manifest that as the drum 10 is being rotated under the influence of the strap 23, friction will be applied to retard or modify the relative movement of the drums or members 10 and 11 and consequently the action of the spring of the vehicle, when the parts of the vehicle, the motion of which it is desired to retard or modify, are being separated. When however, the parts of the vehicle are being moved toward each other and the stress upon the strap 23 is being released the drum 10 will be rotated by the spring 25 and at the same time the friction of the element 18 will be relieved.

Co-operating with the friction element 18 is a spring 29, one end of which is anchored as at 30 to the hub 26 of the member 11. The other end of the spring engages a member 31 which is contacted as at 32 with the element 18 adjacent the end 19 thereof, and this spring 29 exerts its stress upon the end of the element 18 to cause the element to frictionally bind the inner periphery of the member 10 to insure a bodily movement of the element 18 with the member 10 when the latter is rotated.

The degree of friction created by the spring 29 may be varied in any suitable manner such as by means of a nut or collar 33 threaded upon the member 31 and against which nut or collar 33 one end of the spring 29 rests.

The friction created by the spring 29 is sufficient to yieldingly anchor the end 19 of the element 18 so as to permit the element 18 to be expanded when the end 20 thereof contacts with the lug or projection 22 and this is occasioned by reason of the fact that when the end 20 of the element 18 contacts with the lug 22 and the member 10 is rotated in a clockwise direction, the spring 29 will be distorted sufficiently to increase the friction between the end 19 of the element 18 and the periphery of the member 10.

If desired the member 11 may be cut away as at 34 so as not to interfere with the movement or operation of the spring 29 and the member 31.

Figure 4:
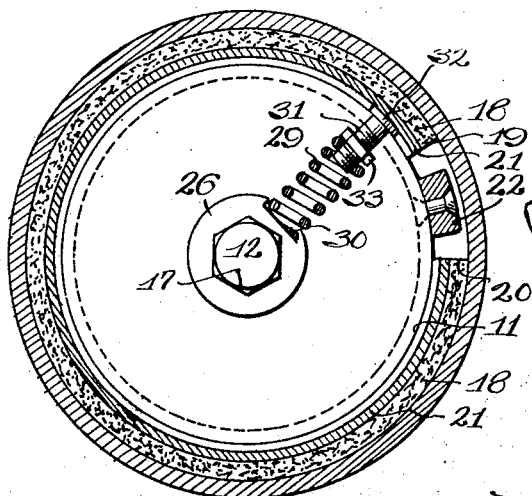
Figure 4 is a view similar to Figure 1 of another form of the invention.
Figure 5:
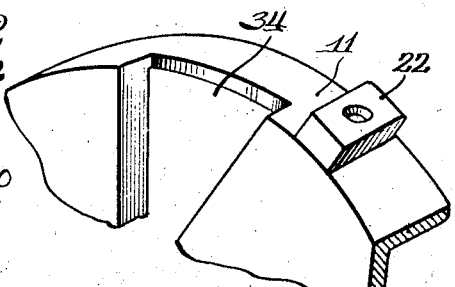
Figure 5 is a perspective view of a detail.

In the form of the invention shown in Figure 1, the spring 35 which corresponds with the spring 29 shown in Figure 4, co-operates with the member 36 and this member co-operates with a shoe like member 37, having a friction creating surface 38. The shoe like member 37 and the surface 38 thereof are independent of the member 11 and corresponds with the lug or projection 22 in the form of the invention shown in Figures 4 and 5.

In this form of the invention a lug 39 is provided on the member 11 to stand between the ends 19 and 20 of the element 18.

When the member 10 is rotated in an anticlockwise direction the resiliency of the element 18 will cause it to move bodily with the member 10 until the end 20 thereof contacts with the lug 39, which latter will resist the bodily movement of the element 18. The shoe or member 37—38 will then engage the end 19 of the element 18 to expand the element and increase the friction, thereby retarding the action of the member 10.

When the member 10 is rotated in the opposite or in a clockwise direction, the element 18 will travel with the shoe or member 37—38, causing the end 20 of the element to move away from the lug or projection 39, and the element 18 will then contract.

The stress of the spring 35 upon the shoe or member 37—38 may be varied by means of an adjustable nut or collar 40, against which one end of the spring 35 rests.

This form of the invention will also permit of a limited free unretarded or unmodified action of the springs of the vehicle.

While the preferred forms of the invention have been herein shown and described, it is to be understood that various changes may be made in the details of construction and in the combination and arrangement of the several parts, within the scope of the claims, without departing from the spirit of this invention.

What is claimed as new is:—

1. A shock absorbing device including two members relatively movable one with relation to the other and spaced from each other, a floating friction creating element interposed between said members and free for bodily forward and backward movement, said members having a free relative movement in one direction, and means responsive to the relative movement of the said members in the opposite direction for causing said friction creating element to retard the relative movement of the said members in the last recited direction.

2. A shock absorbing device including two members relatively movable one with relation to the other and spaced from each other, a resilient flexible floating friction creating element interposed between said members, said element being bodily and freely movable with respect to said members, said members having a free relative movement in one direction, and means responsive to the relative movement of the said members in the opposite direction for causing said friction creating element to retard the relative movement of the said members in the last recited direction.

3. A shock absorbing device including a pair of spaced concentrically arranged members relatively movable, a flexible friction creating element interposed in said space and extending about one of the members, said element being bodily and freely movable with respect to said members, said element permitting a free movement of the members when said members are relatively moved in one direction, and means operating to expand said element to cause said element to frictionally retard the movement of the members when the said members are relatively moved in a direction opposite to the direction of the last recited relative movement.

4. A shock absorbing device including concentrically arranged members relatively rotatable, a floating resilient element between the members and extending partially about one of the members, said members being freely rotatable in one direction one with relation to the other, and means operatively connected with one of the said members and operable upon the said element when the said members are relatively rotated in another direction, to retard the last recited relative movement of said members.

5. A shock absorbing device including concentrically arranged members relatively rotatable, a flexible friction creating element between said members and partially encompassing one of the members, said element being bodily movable with one of the members when the latter is moved in one direction with respect to the other member to permit a free relative movement of the members, and means engaging one end of the said element to expand said element when the said members are relatively moved in another direction, whereby said element will frictionally retard the last recited relative movement of said members.

6. A shock absorbing device including concentrically arranged members relatively rotatable, a flexible friction creating element between said members and partially encompassing one of the members, said element being bodily movable with one of the members when the latter is moved in one direction with respect to the other member to permit a free relative movement of the members, means engaging one end of the said element to expand said element when the said members are relatively moved in another direction, whereby said element will frictionally retard the last recited relative movement of said members, means for imparting a relative movement of the members in one direction, and additional means for imparting a different direction of relative movement to the said members.

7. A shock absorbing device including a pair of concentrically arranged members relatively movable in a forward and a backward direction, an open resilient band like friction creating element between the members, and means carried by one of the members and operating between the ends of said element to permit of a limited free idle relative movement of the members, said element being bodily movable with one of the members when the latter is rotated in one direction, the said means being adapted when the last recited member is moved in the opposite direction to engage one end of said element to expand the latter to increase the degree of friction between said element and the last recited member to retard the movement of the latter.

8. A shock absorbing device including a pair of concentrically arranged members relatively movable in a forward and a backward direction, an open resilient band like friction creating element between the members, means carried by one of the members and operating between the ends of said element to permit of a limited free idle relative movement of the members, said element being bodily movable with one of the members when the latter is rotated in one direction, the said means being adapted when the last recited member is moved in the opposite direction to engage one end of said element to expand the latter to increase the degree of friction between said element and the last recited member to retard the movement of the latter, and additional resilient means operating upon a portion of the said element for assisting in frictionally binding said element to one of the said members.

9. A shock absorbing device including a pair of concentrically arranged members relatively movable in a forward and a backward direction, an open resilient band like friction creating element between the members, means carried by one of the members and operating between the ends of said element to permit of a limited free idle relative movement of the members, said element being bodily movable with one of the members when the latter is rotated in one direction, the said means being adapted when the last recited member is moved in the opposite direction to engage one end of said element to expand the latter to increase the degree of friction between said element and the last recited member to retard the movement of the latter, additional resilient means operating upon a portion of the said element for assisting in frictionally binding said element to one of the said members, and means for varying at will the stress of the said additional resilient means.

10. A shock absorber including concentrically arranged drum like members, an open band like element disposed between the members, means connected with one of the members and operating in the space between the ends of the said element, and means for causing the said element to bodily travel with one of the said members when the latter is moved in one direction, the first said means being adapted to engage one end of the said element to expand the latter to frictionally retard the relative movement of the said members, the second recited means co-operating with the other end of the said element to restrain the movement of the last recited end of the element while the said element is being expanded.

11. A shock absorber including concentrically arranged drum like members, an open band like element disposed between the members, means connected with one of the members and operating in the space between the ends of the said element, and means for causing the said element to bodily travel with one of the said members when the latter is moved in one direction, the first said means being adapted to engage one end of the said element to expand the latter to frictionally retard the relative movement of the said members, the second recited means co-operating with the other end of the said element to restrain the movement of the last recited end of the element while the said element is being expanded, the second recited means including a friction creating device for causing a portion of the said element to frictionally grip one of the said members.

12. A shock absorber including concentrically arranged drum like members, an open band like element disposed between the members, means connected with one of the members and operating in the space between the ends of the said element, means for causing the said element to bodily travel with one of the said members when the latter is moved in one direction, the first said means being adapted to engage one end of the said element to expand the latter to frictionally retard the relative movement of the said members, the second recited means co-operating with the other end of the said element to restrain the movement of the last recited end of the element while the said element is being expanded, the second recited means including a friction creating device for causing a portion of the said element to frictionally grip one of the said members, and means for varying at will the stress of the said friction creating device.

13. A shock absorber including a pair of concentrically arranged members relatively rotatable, an open band like element interposed between said members, a projection carried by one of the members and operating in the space between the ends of the said element and adapting said members for a limited free idling relative movement, and means causing the said element to bodily move with one of the members, the said projection and one of the ends of said element being adapted to be brought into engagement to expand the said element to increase the degree of friction between the said element and one of the said members to retard the relative movement of said members.

14. A shock absorber including a pair of concentrically arranged members relatively rotatable, an open band like element interposed between said members, a projection carried by one of the members and operating in the space between the ends of the said element and adapting said members for a limited free idling relative movement, means causing the said element adjacent one end to bind upon one of the said members with sufficient friction to cause the element to bodily move with one of the members, means for varying at will the stress of the last recited means, the said projection and the other end of the said element being adapted to be brought into engagement to expand the said element to increase the degree of friction between the body of the said element and one of the said members to retard the relative movement of the said members and while the first recited end of said element frictionally grips one of the said members.

15. A shock absorber including a pair of concentrically arranged members relatively rotatable, an open band like element interposed betwen said members, a projection carried by one of the members and operating in the space between the ends of the said element and adapting said members for a limited free idling relative movement, means causing the said element adjacent one end to bind upon one of the said members with sufficient friction to cause the element to bodily move with one of the members, means for varying at will the stress of the last recited means, the said projection and the other end of the said element being adapted to be brought into engagement to expand the said element to increase the degree of friction between the body of the said element and one of the said members to retard the relative movement of the said members and while the first recited end of said element frictionally grips one of the said members, the stress of the first recited means operating upon the said element in a direction transverse to the axis of the element.

16. A shock absorber including a pair of concentrically arranged members relatively rotatable, an open band like element interposed between said members, a projection carried by one of the members and operating in the space between the ends of said element and adapting said members for a limited free idling movement, and resilient and laterally deflectable means between the said members adjacent one end of the said element and operating to cause the said element to bodily move with one of the said members, the said projection and the other end of said element being adapted to be brought into engagement to expand the element as the first recited end is moved with one of the said members, thereby increasing the degree of friction of the said element with one of the said members to retard the relative movement of the said members.

17. A shock absorber including a pair of concentrically arranged members relatively rotatable, an open band like element interposed between said members, a projection carried by one of the members and operating in the space between the ends of said element and adapting said members for a limited free idling movement, resilient and laterally deflectable means between the said members adjacent one end of the said element and operating to cause the said element to bodily move with one of the said members, the said projection and the other end of said element being adapted to be brought into engagement to expand the element as the first recited end is moved with one of the said members, thereby increasing the degree of friction of the said element with one of the said members to retard the relative movement of the said members, means for relatively moving the said members in one direction, and means for relatively moving the members in the opposite direction.

18. A shock absorber including a stationary surface, a member oscillatable back and forth across said surface, means for imparting a relative movement to the said member with respect to said surface and in one direction and against the stress of which means the said member is adapted to be relatively moved with respect to the said surface in the opposite direction, a floating friction creating element contacting with the said surface and member, said element being bodily and freely movable with and with respect to said member, and a fixed abutment for arresting the movement of said element with the said member to cause a relative and frictional movement of the said member and element one with relation to the other.

In testimony whereof I have signed my name to this specification, on this 19th day of November, A. D. 1924.

EDWARD L. LEINBACH.